United States Patent
Kuo et al.

[11] Patent Number: 6,048,255
[45] Date of Patent: Apr. 11, 2000

[54] PULSED LASER SURFACE TREATMENTS FOR MAGNETIC RECORDING MEDIA

[75] Inventors: David S. Kuo, Castro Valley, Calif.; Dallas W. Meyer, Burnsville, Minn.

[73] Assignee: Seagate Technology, Inc., Scotts Valley, Calif.

[21] Appl. No.: 08/522,287

[22] PCT Filed: Aug. 22, 1995

[86] PCT No.: PCT/US95/10697

§ 371 Date: Jun. 26, 1997

§ 102(e) Date: Jun. 26, 1997

[87] PCT Pub. No.: WO97/07931

PCT Pub. Date: Mar. 6, 1997

[51] Int. Cl.$^7$ .................................................. B24B 1/00
[52] U.S. Cl. ............................. 451/41; 451/53; 451/54; 451/55; 451/63; 360/135
[58] Field of Search ................................. 438/692, 693; 451/28, 41, 53, 55, 63; 219/121.17, 121.25, 121.26; 360/135; 428/334, 336, 335, 339, 450, 631, 680, 694 R, 694 ML, 693

[56] References Cited

U.S. PATENT DOCUMENTS

| | | |
|---|---|---|
| 4,326,229 | 4/1982 | Yanagisawa . |
| 4,390,392 | 6/1983 | Robinson et al. . |
| 4,522,848 | 6/1985 | Patel . |
| 4,609,964 | 9/1986 | Sobel . |
| 4,626,941 | 12/1986 | Sawada et al. . |
| 4,698,251 | 10/1987 | Fukuda et al. . |
| 4,724,219 | 2/1988 | Ridinger . |
| 4,996,622 | 2/1991 | Takatsuki et al. . |
| 5,062,021 | 10/1991 | Ranjan et al. . |
| 5,108,781 | 4/1992 | Ranjan et al. . |
| 5,232,674 | 8/1993 | Mukai et al. . |
| 5,399,523 | 3/1995 | Kakoschke . |

FOREIGN PATENT DOCUMENTS

| | | |
|---|---|---|
| 63-232937 | 9/1988 | Japan . |
| 0211924 | 8/1989 | Japan . |

Primary Examiner—Timothy V. Eley
Attorney, Agent, or Firm—Frederick W. Niebuhr

[57] ABSTRACT

A surface treatment process employing pulsed laser energy enables selective texturizing and polishing of non-magnetizable substrate disks used in fabricating magnetic reading and recording media. Substrate surfaces are texturized over dedicated head contact zones to form multiple nodules that are highly uniform to precisely control surface roughness. Laser polishing of data zones causes localized flow of the substrate material, to remove the residual scratches of mechanical polishing without altering the non-magnetic character of the substrate at large. Between the data zones and contact zones, transition zones can be formed by selectively graduating the nodule heights in the radial direction. The rounded structure of the nodules increases surface resistance to intended or incidental transducing head contact. Removal of residual scratches enhances resistance to corrosion and improves signal quality, since subsequent layers, including the thin film recording layer and the protective carbon layer, tend to replicate the substrate surface topography.

43 Claims, 5 Drawing Sheets

PULSED LASER SURFACE TREATMENTS FOR MAGNETIC RECORDING MEDIA

BACKGROUND OF THE INVENTION

The present invention relates to media for recording, storing and reading magnetic data, and more particularly to the use of radiant energy beams to control topographies of such magnetic media.

Magnetic disks employ thin films of magnetizable material for storing data in magnetic form. Typically magnetic disks are mounted to rotate, each of with magnetic data transducing heads positioned in close proximity to one of the magnetic disk recording surfaces. Each head is moved generally radially with respect to its associated disk as the disk is rotated. In drives that employ rigid magnetic disks, the disks are rotated at high speeds during reading and recording operations. The speed of rotation is sufficient to create an air cushion or bearing that supports each transducing head at a controlled distance from its associated recording surface, to maintain a consistent head "flying" height. The transducing heads contact their associated disks whenever the disks are stationary, accelerating from a stop, or decelerating just before coming to a complete stop.

Designers of magnetic disks continually strive to increase the density at which the magnetic data can be stored. One approach to increasing storage densities is to reduce the transducing head flying height. A smooth, specular recording surface, and a similar opposing surface of the transducing head, permit closer proximity of the head and recording surface. In addition to allowing greater data density, smooth surfaces result in more consistent and predictable behavior of the air bearing and head during operation.

At the same time, excessive smoothness can lead to friction and stiction problems when the transducing head contacts the disk. One solution, disclosed in U.S. Pat. No. 5,108,781 (Ranjan et al), involves selectively texturizing a predetermined portion of the disk surface, sometimes designated as the landing or contact zone. Then, the transducing head is positionally controlled so that whenever the disk decelerates toward a stop, the head engages the disk at the landing zone rather than at the relatively smoother recording surface. This patent further discloses the use of laser energy to control the landing zone texture. More particularly, a neodymium:yttrium aluminum garnet (Nd:YAG) laser generates a pulsed laser beam focused upon the upper surface of an aluminum nickel-phosphorous substrate. The laser forms a series of laser marks or spots, each including a central depression surrounded by an annular, raised rim.

While this approach remains satisfactory for most applications, there are certain particularly demanding circumstances for which the depressions and their surrounding rims result in excessive surface roughness, or lack sufficient uniformity. These applications involve further reductions in transducing head flying heights, for example to as low as a single microinch (25.4 nm). The lower flying heights also place severe demands upon the relatively smooth data recording surfaces of the magnetic disks. More particularly, the recording surfaces must be polished extremely smooth to avoid sharp peaks and other acicular features that might contact a low flying transducing head.

It is well known to polish disks mechanically, i.e. employing a saturated cloth, paper, or pad coated or flooded with cerium oxide, silicon carbide or another suitable grit. To achieve roughness levels of 0.1 microinch (2.54 nm) or less, the abrading process usually involves several stages of increasingly fine grit. Alternatively, mechanical polishing can involve a time consuming single stage, using a very fine grit material. In either event, a substantial amount of stock must be removed, considerably increasing media production costs and potentially degrading media quality due to an unwanted curvature near the edges. The residual scratches formed by mechanical polishing can cause defects in the subsequently applied magnetic recording film, due to replication of surface topography. These defects are a source of noise. The residual scratches also reduce the uniformity of a protective carbon film applied over the magnetic recording layer, which diminishes resistance to corrosion.

Therefore, it is an object of the present invention to provide a magnetic data recording medium in which the texture of a dedicated transducing head contact zone is more uniform and more precisely controlled.

Another object is to provide a process for directing a coherent energy beam onto an exposed surface of a magnetic recording medium, controlling the beam to control the height and structural features of nodules and other discontinuities.

A further object is to provide a process for selectively directing laser energy onto a data recording surface of a magnetic medium substrate after a surface of the substrate has been mechanically polished, to remove residual scratches without undesirably altering the character of the treated substrate.

Yet another object is to provide a magnetic data recording medium with a data recording surface that is smooth, essentially free of residual scratches and other acicular features, and more resistant to corrosion.

SUMMARY OF THE INVENTION

To achieve these and other objects, there is provided a process for polishing a non-magnetizable substrate in the course of fabricating a magnetic data reading and recording medium in which a magnetizable recording layer is applied over the non-magnetizable substrate. The process includes:

a. mechanically abrading a non-magnetizable substrate to form on the substrate a substantially planar substrate surface having a surface roughness, due to residual scratches formed by the mechanical abrasion, of at most about 25 nm;

b. following the mechanical abrasion, applying radiant energy to the substrate surface over a selected surface portion thereof, to melt the substrate within a melt region that includes the selected surface portion and a depth, measured inwardly of a nominal surface plane of the substrate surface, that exceeds said roughness, whereby substrate material in the melt region flows, to substantially eliminate the residual scratches; and c. causing the substrate material to solidify, thus to form the selected surface portion as specular and substantially free of the residual scratches.

Preferably the application of radiant energy is achieved by directing a beam of coherent energy onto the substrate surface to define an irradiation area of beam impingement onto that surface, and translating the substrate and beam relative to one another to move the irradiation area along a path that substantially covers the selected surface portion. The beam profile and its angle of incidence to the substrate surface determine the shape of the irradiation area, e.g. circular, elliptical, etc. In one advantageous arrangement, a beam with a circular profile, i.e. cross section, is oriented perpendicular to the substrate surface, to form a circular irradiation area.

The extent of surface heating, and thus the depth of the melt region, is controlled primarily by the level of energy at the irradiation area and the dwell time, i.e. the period during which a particular location on the substrate surface is irradiated. When the coherent energy is pulsed, dwell time is controlled by the pulse duration and pulse frequency. Dwell time is influenced slightly by the velocity of the irradiation area relative to the substrate surface, although the pulse time is so short that this factor usually is insignificant. The energy level is controlled by the power at which the beam is generated, by any attenuation between the beam source and area of impingement, by the degree of beam focusing and the spatial characteristics of the beam.

The preferred energy source is a solid state laser, more particularly a neodymium:yttrium lithium fluoride (Nd:YLF) laser. As compared to the Nd:YAG laser discussed in the aforementioned U.S. Pat. No. 5,108,781, the solid state Nd:YLF laser is operable at lower energy levels and is substantially more stable in terms of pulse level and pulse duration. This yields a considerable improvement in the surface altering capabilities of the laser, for producing more uniform and repeatable features such as the rimmed depressions disclosed in the '781 patent. Moreover, the solid state laser has been found to enable surface polishing, and the formation of unique surface irregularities.

As one example of the improvement achieved, the Nd:YLF laser can be pulsed and focused to provide a localized but relatively wide irradiation area, with the pulse duration selected to melt the substrate surface, but only momentarily and to a depth of at most about 40 microinches (1 micron), more preferably about 250 nm and most preferably 38 nm. This approach is particularly effective to remove residual scratches after a conventional substrate disk (aluminum plated with a 3–10 micron thick layer of a nickel-phosphorous alloy) has been mechanically polished. The depth of material melting is more than ample to encompass the residual scratches. Yet, because the melting depth is selected to be at most about 10 percent of the Ni—P layer thickness in any event, the melting depth is minute in relation to the thickness of the Ni—P layer. The rapid cooling and resolidification of the melted region and its shallowness in comparison to the alloy layer thickness, preserve the non-magnetic character of the alloy layer, which would be destroyed if the layer were subjected to sufficient heat to cause a more general crystallization. More particularly, the original structure of the Ni—P layer is preserved throughout most of its thickness.

It has been found that laser polishing does not necessarily reduce surface roughness. For example, a surface mechanically abraded to a peak roughness of about 2 nm, when subjected to a laser polishing as described herein, may exhibit an increased roughness, e.g. to about a 3 nm maximum peak height. However, the resulting roughness is caused by a lower frequency waviness or undulation, as compared to the higher frequency, acicular character of the peaks and valleys of residual scratches. Accordingly, media performance is improved, in terms of reduced noise and better corrosion resistance, while a satisfactorily low roughness is retained.

In other cases, e.g. when the substrate surface has a residual roughness of about 25 nm or more, or is mechanically abraded to a roughness of about 25 nm or more, laser polishing not only removes acicular features, but also reduces surface roughness.

Beyond polishing, the laser can be employed to control the texture of a selected surface zone dedicated to transducing head contact, and therefore having a roughness greater than that of an adjacent or proximate data recording zone. To this end, the dedicated zone is selectively textured by forming laser marks or spots. The laser beam, generated at power levels comparable to those used in laser polishing but focused to a substantially smaller irradiation area, has been found to form a nodule or dimple that projects outwardly from the substrate surface. The formation of nodules, rather than the aforementioned rimmed depressions, results from reduced energy levels and concentrations at the irradiation area. Beyond this, the exact reason for nodule formation as opposed to depression formation is not fully understood. In both cases, the Gaussian nature of the impinging laser beam concentrates heat near the beam center. One hypothesis for bump formation is that the beam impingement, when momentarily melting material in the beam irradiation area, forms a wave originating at the center of the irradiation area and tending to propagate radially outward. The wave is preserved due to the rapid cooling and solidifying of the substrate material. For higher energy levels, the wave propagates outward before material solidifies, forming a ring or rim surrounding a depression. At lower energy levels, the melted substrate material solidifies so rapidly that the wave has not begun to migrate radially outward. Thus, a bump or nodule, rather than a depression, is formed.

The level of energy at which rimmed depressions become nodules (and vice versa) varies with the substrate material, as might be expected. Further, it has been found to vary among different sets or batches of aluminum nickel-phosphorous substrates, although within a given batch there is a high degree of consistency and a close relationship between the energy level and nodule size. Accordingly, some testing is needed to determine the appropriate energy levels in different situations.

Formation of nodules, rather than rimmed depressions, is a surprising and advantageous result. Nodules produced on a given substrate under the same conditions (pulse level, degree of attenuation and pulse duration) exhibit a high degree of uniformity in height, e.g. often with a standard deviation of less than about 1 nm. More generally, bumps are the preferred discontinuity since, as compared to the depressions, they are less likely to entrap debris and enhances liquid lubricant replenishment.

Accordingly, another aspect of the present invention is a process for selectively texturizing magnetic recording media, including:

a. forming a specular substrate surface on a non-magnetizable substrate body, the substrate surface being substantially planar and having a nominal roughness;

b. concentrating radiant energy selectively upon a plurality of locations over a treatment area of the substrate surface to controllably alter the topography of the selected surface at each of the locations to form a rounded nodule having a height, above a nominal surface plane of the selected one of the surfaces, in the range of about 2.5–25 nm and greater than said nominal roughness; and c. depositing a magnetizable film over the substrate surface as a layer substantially uniform in thickness to provide a recording surface.

In a preferred application the treatment area is an annular band that provides a dedicated transducing head contact area adjacent a smoother data recording area. Typically the band is relatively narrow and is disposed at a radially inward edge of the data recording area.

The degree of control over nodule size affords a further improvement, namely a transition zone between the transducing head contact zone and the data recording zone. In particular, throughout an annular transition zone between the contact zone and recording zone, nodule sizes can be controllably varied to diminish in the radial direction, e.g. receding from a height of about 20 nm. The gradient across the transition zone reduces disturbances as the transducing head is translated radially between the contact and data zones, reducing the chance for head crash.

A further aspect of the invention is a process for texturing a substrate surface of a glass substrate, in preparation for subsequent application of a magnetizable thin film. The process includes:

a. depositing a metal onto a glass substrate as a metallic layer of uniform thickness of at least 5 nm;

b. concentrating coherent radiant energy selectively upon a plurality of locations over a treatment area of the metallic layer to controllably alter the substrate topography at each of the locations to form at each location a surface irregularity said surface irregularities having heights, above a nominal surface plane of the substrate surface, in the range of 3–200 nm.

Thus according to the present invention, radiant energy is selectively applied to magnetic recording media to control surface topography across data zones, contact zones and transition zones. Data zone smoothness, corrosion resistance and signal reproduction characteristics are enhanced by radiant energy polishing to remove the residual scratches and other acicularities produced by mechanical texturing and polishing. Formation of nodules by radiant energy texturing results in a highly uniform roughness throughout the contact zone, and a controlled roughness gradient radially across a transition zone if desired. Lower transducing head flying heights are realized, enabling storage of data at increased density.

IN THE DRAWINGS

For a further appreciation of the above and other features and advantages, reference is made to the following detailed description and to the drawings, in which.

DETAILED DESCRIPTION OF THE PREFERRED EMBODIMENTS

Figure 1:
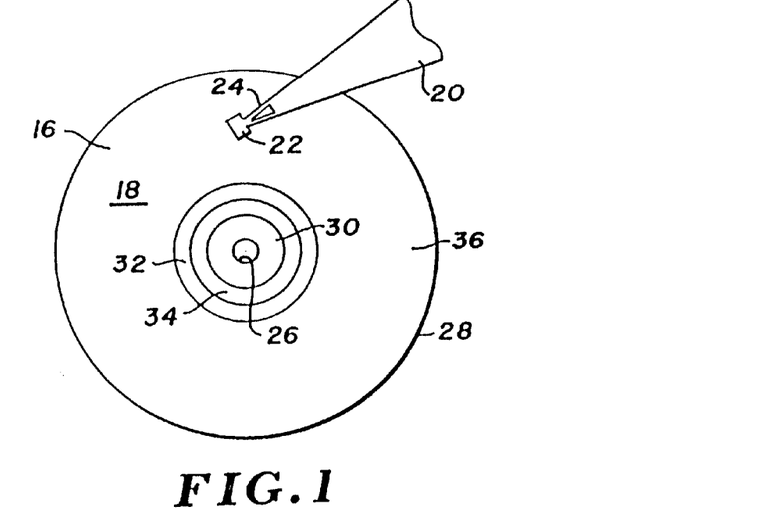
FIG. 1 is a plan view of a rigid magnetic disk and a transducing head supported for generally radial movement relative to the disk.
Figure 2:
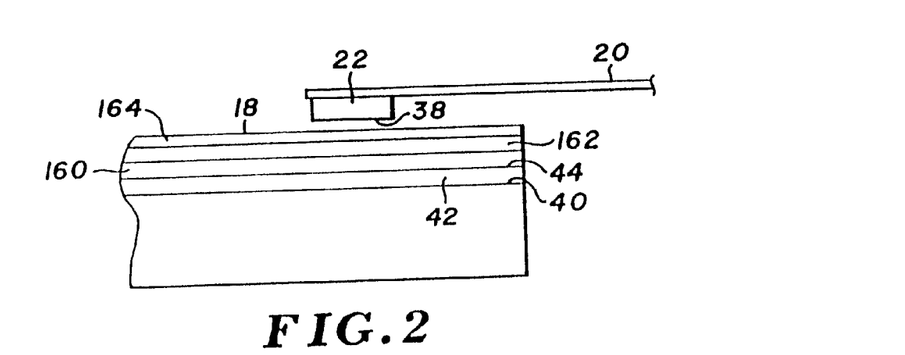
FIG. 2 is an enlarged partial sectional view of the magnetic disk in FIG. 1.

Turning now to the drawings, there is shown in FIGS. 1 and 2 a medium for recording and reading magnetic data, in particular a magnetic disk 16 rotatable about a vertical axis and having a substantially planar and horizontal upper surface 18. A rotary actuator (not shown) supports a transducing head support arm 20 in cantilevered fashion. A magnetic data transducing head 22 is mounted to the free end of support arm 20, through a suspension 24 which allows gimballing action of the head, i.e. limited vertical travel and rotation about pitch and roll axes. The rotary actuator and the support arm pivot to move head 22 in an arcuate path, generally radially with respect to disk 16.

At the center of disk 16 is an opening 26 to accommodate a disk drive spindle (not shown) used to rotate the disk. Between opening 26 and an outer circumferential edge 28 of the disk, upper surface 18 is divided into four annular sectors; a radially inward sector 30 for clamping disk 16 to the spindle; a dedicated transducing head contact zone 32; a transition zone 34; and a data zone 36 that serves as the area for recording and reading the magnetic data.

When disk 16 is at rest, or rotating at a speed substantially below the normal operating range, head 22 contacts upper surface 18. However, when the disk rotates within the normal operating range an air bearing or cushion, formed by air flowing between head 22 and upper surface 18 in the direction of disk rotation, supports the head in parallel, spaced apart relation to the recording surface. Typically the distance between a planar bottom surface 38 of head 22 and upper surface 18, known as the head "flying height", is about ten microinches (254 nm) or less. The flying height should be as low as practicable for maximizing the density of data stored on disk 16.

For data recording and reading operations, disk rotation and rotary arm pivoting are controlled in concert to selectively position transducing head 22 near desired locations within data zone 36. Following a reading or recording operation, as disk 16 is decelerated, support arm 20 is moved radially inward to position head 22 directly over contact zone 32. Thus, by the time disk 16 decelerates sufficiently to permit the head and upper surface to engage, the head is positioned for engagement only with the contact zone. Prior to the next recording or retrieval of data, disk 16 is accelerated from stop, initially with head 22 engaged with a disk within contact zone 32. The rotary arm is not pivoted until head 22 is supported by an air bearing, free of the contact zone.

Magnetic disk 16 is formed by polishing, grinding or otherwise mechanically finishing an aluminum substrate disk to provide a substantially flat upper surface 40. Next, a nickel-phosphorous alloy is plated onto the upper surface of the substrate disk, to provide a nonmagnetizable layer 42 with a uniform thickness within the range of about 2–10 microns. Following plating, the upper surface of the Ni—P alloy layer, i.e. a substrate surface 44, is polished to a roughness of generally less than 0.1 microinch (2.54 nm). A saturated cloth, paper or pad coated or flooded with cerium oxide, silicon carbide or another suitable grit, is used for this purpose. A liquid slurry containing grit also may be used.

Figure 3:
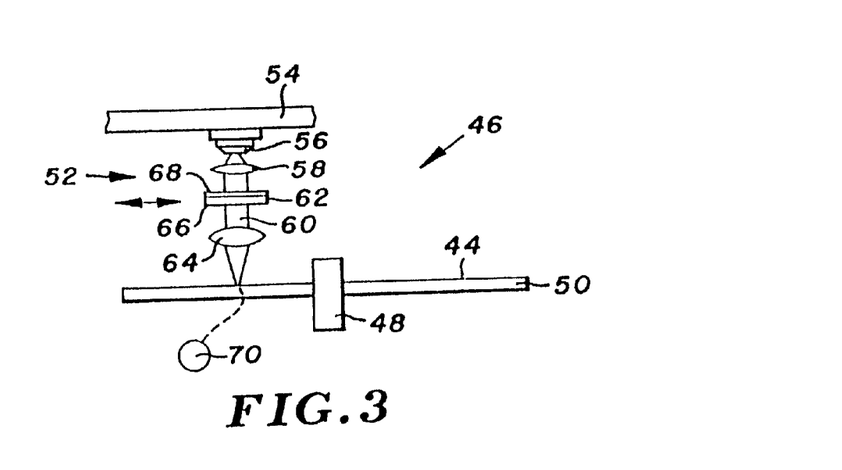
FIG. 3 is an elevational view of an apparatus for polishing and texturing magnetic disk substrates.

Laser treatment preferably follows the mechanical polishing of substrate surface 44. Treatment is accomplished using a laser texturing and polishing apparatus 46. As seen in FIG. 3, apparatus 46 includes a spindle 48 for rotatably supporting the substrate disk, indicated at 50. A laser module 52 is supported on a carriage 54 for reciprocal movement radially of the substrate disk. The laser module includes a neodymium:yttrium lithium fluoride (Nd:YLF) diode laser 56, collimating optics 58 for collimating the diode laser output to produce a beam 60 having a diameter of about one mm, an attenuator 62, and converging optics 64 for focusing beam 60 at or approximately at substrate surface 44. As illustrated, attenuator 62 is a neutral density filter, for example a glass plate 66 bearing a film 68, applied by sputtering unevenly to provide a transmissivity gradient across the plate. Movement of plate 66, transversely of the longitudinal beam direction, controllably varies the proportion of beam energy transmitted to converging optics 58 and thus varies the energy intensity at the substrate surface.

Diode laser 56 is an Nd:YLF diode pumped laser, e.g. as available from Spectra Physics. Preferably, diode laser 56 is pulsed for texturing and polishing operations, although a continuous mode (less preferred) can be used in polishing. Apparatus 46 can be controlled in texturing and polishing operations to determine a variety of substrate surface topographies and characteristics. In essence, texturing and polishing involve rotating substrate disk 50 at a controlled speed while carriage 54 moves laser module 52 at a controlled radial speed. At the same time, the diode laser is controlled to provide a pulsed beam at a predetermined frequency, and at a predetermined pulse duration. If desired, the disk rotational speed may be gradually reduced as the laser module is moved radially outward, to maintain a substantially constant linear velocity.

Beam 60 is perpendicular to substrate surface 44 and defines a substantially circular area 70 of beam impingement onto the surface. It is to be appreciated that the impingement area can be made elliptical if desired, either by changing the beam to a non-perpendicular orientation, or by changing the converging optics, e.g. to a cylindrical lens. In either event, the manner in which the surface is altered depends on the energy distribution at the impingement area and the dwell time, i.e. the duration over which impingement area 70 coincides with a particular portion of the substrate surface. The effect of simultaneous disk rotation and laser module translation is to move impingement area 70 in a spiral path over the substrate surface. Although a spiral path is preferred, laser module 52 can be stepped at each disk rotation so that the path consists of concentric circles.

Energy distribution at the impingement area depends on several factors, including the power at which diode laser 56 is fired, the degree of attenuation, and the extent of laser beam focus. Energy distribution also depends upon the mode in which diode laser 56 is operated. For example, the TEM$_{00}$ mode yields a Gaussian energy distribution that concentrates the energy near the center of the impingement area. Sharper focusing also tends to concentrate energy near the impingement area center.

When beam 60 is pulsed, dwell time is primarily a function of pulse duration. Dwell time also is slightly influenced by the disk rotational speed and the radial speed of laser module 52. Further, when the diode laser is pulsed, surface topography is a function of the pulse frequency, i.e. the number of pulses per unit time.

There is an energy threshold below which beam 60 can be used to form upwardly protruding nodules, rather than rimmed depressions, in the substrate surface. Operating ranges for several parameters have been found to produce nodules having heights ranging from about 0.1 to about 2 microinches (2.5–51 nm). More particularly, diode laser 56 is fired at levels of 1–50 $\mu$J, and more preferably within a range of 1–6 $\mu$J. Given the low energy level, beam 60 is sharply focused to a focal diameter, i.e. impingement area diameter, and more preferably in the range of 5–15 microns. Diode laser 56 is operated in the TEM$_{00}$ mode, which produces a Gaussian distribution of energy in beam 60 and therefore across impingement area 70. The resultant concentration of energy near the center of the impingement area promotes nodule formation. Diode laser 56 preferably is pulsed as noted above, and the preferred pulse duration is in the range of 5–200 ns (and more preferably about 20–40 ns), with duration encompassing the time during which the pulse level is at or above 10 percent of peak amplitude.

Figure 4:
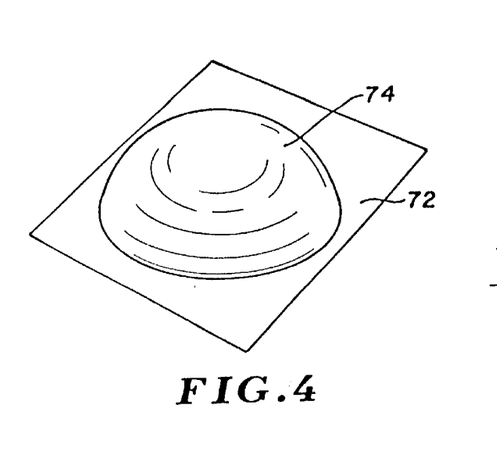
FIG. 4 is an enlarged perspective view of a nodule in the surface of a magnetic disk substrate, formed by the apparatus of FIG. 3.
Figure 5:
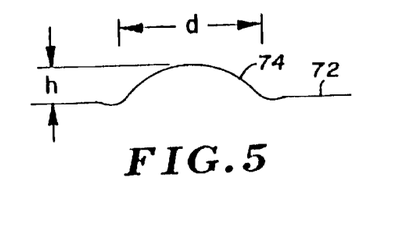
FIG. 5 illustrates the profile of the nodule in FIG. 4.

A typical nodule formed by diode laser 56 is represented in perspective in FIG. 4 and in profile in FIG. 5. The nodule extends above the specular surface plane of the substrate surface, i.e. a nominal plane 72, by a height "h" of 0.3 microinches (7.6 nm). Nodule 74 has a diameter "d" of about 5 microns. At its base, the nodule is surrounded by a minute annular depression. Within the operating ranges noted above, increasing the power at which diode laser 56 is fired tends to increase the nodule height and diameter. Sharpening the focus to reduce impingement area 70 tends to increase the nodule height. However, care must be exercised when increasing the firing power and/or pulse duration to avoid increasing the energy distribution above the threshold where the laser forms rimmed depressions rather than nodules because of increasing heat penetration.

As explained in greater detail below, texturizing substrate surface 44 involves forming multiple nodules like nodule 74 within contact zone 32 or any other surface area designated for texturing. In comparison to the rimmed depressions discussed above, nodules are preferred for several reasons. Perhaps most apparent is the reduced roughness attainable through using nodules, which can be formed with heights as low as about 0.1 microinch (2.54 nm). A closely related advantage is the enhanced uniformity of nodule formation, primarily due to better stability of the Nd:YLF diode laser, especially at lower power levels. While the rimmed depressions exhibit excellent uniformity when compared to the acicular features of a mechanically abraded surface of similar roughness, nodules 74 afford a further, substantial improvement in uniformity.

Nodule texturizing enhances surface toughness, in terms of resistance to damage from episodes of contact with transducing head 22. Notwithstanding that FIGS. 4 and 5 exaggerate nodule height in comparison to nodule diameter, it can be appreciated that nodules 74 are more stable than rimmed depressions of comparable size, because of their rounded, slightly convex structure, i.e. the degree to which diameter "d" exceeds height "h". Finally, and probably due to the lack of any substantial depressions, a nodule texturized surface exhibits improved friction characteristics due to better lubricant replenishment, and is less apt to collect or entrap debris.

Beyond controlling the nature of individual nodules 74, apparatus 46 is controlled to provide a desired pattern or distribution of nodules throughout a texturized region of the substrate surface. In an example involving the controlling parameters mentioned above, substrate disk 50 is rotated at a speed, variable depending upon the diode laser's radial rotation, to provide a linear (arcuate) velocity of about one meter per second. Pulses of ten nanosecond duration are provided at a frequency of 50,000 pulses per second, i.e. one pulse every twenty microseconds. This would yield a twenty micron distance between adjacent nodules, center to center. Further, laser module 52 is translated radially at a velocity that varies with the disk rotational velocity, e.g. for translation of twenty microns with each revolution. The result is a spiral pattern of nodules, with spacing between adjacent nodules and spacing between adjacent circular tracks of nodules both equaling twenty microns.

As an alternative example, the same pattern can be formed with constant velocities of disk rotation and laser module radial translation, if the pulse frequency is controllably varied from a mean value of 50,000 pulses per second, depending on the beam's radial position.

In either event, at the meter per second linear velocity, beam impingement area 70 travels only ten nm during each pulse. Because this distance is slight in relation to the impingement area diameter, the impingement area can be considered essentially stationary during the formation of each nodule.

A spiral pattern of nodules is preferred, since it involves a single, continuous path that requires only several seconds for a full texturing, i.e. complete nodule formation throughout contact zone 32.

Figure 6:
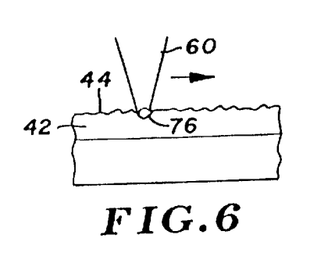
FIGS. 6–8 schematically illustrate laser polishing of a mechanically polished substrate.

Apparatus 46 is not limited to texturing surfaces, but also can be used to polish data zone 36, or any other chosen region of the substrate surface. Laser polishing is illustrated schematically in FIGS. 6–8. As seen in FIG. 6, laser beam 60 is focused upon substrate surface 44, i.e. the upper surface of nickel-phosphorous layer 42. Beam 60 is not as sharply focused as in the case of nodule formation. For polishing, the preferred diameter of the focal spot or beam impingement area is within the range of 50–100 microns. Diode laser 56 is fired at a power level within the range of 1–50 μJ and more preferably 1–6 μJ. The use of spatial filtering allows the more uniform (i.e. non-Gaussian) distribution of power over the surface. The energy distribution within beam 60 and upon impingement area 70 is considerably more uniform, i.e. non-Gaussian. Consequently the tendency to form nodules is considerably reduced. However, there is a sufficient distribution of energy to melt the nickel-phosphorous material within and proximate the impingement area, with the area of melted material having a diameter of at least about thirty microns. The pulse duration is the same as that in nodule formation, i.e. 5–200 ns and more preferably about 20–40 ns.

Given the momentary nature of the pulse, the extent of nickel-phosphorous melting, shown as a melt region 76 in FIG. 6, is limited. Most preferably the melt region is extremely thin, e.g. on the order of 38 nm (1.5 microinches). However, good results are obtained with thicknesses up to about 250 nm (10 microinches), with less preferred but satisfactory results up to a thickness of about 1000 nm, provided that non-magnetizable layer 42 is sufficient in its thickness. More particularly, the depth of melt region 76 should not exceed about 10 percent of the nickel-phosphorous layer thickness. The minimal depth of melt region 76 is determined by heat loss to the surrounding disk material, virtually instantaneously upon completion of the pulse. This tendency is critical to the polishing process, since any substantial heating throughout the thickness of layer 42 would lead to an undesirable crystallization upon resolidification, magnetizing the nickel-phosphorous layer. Nonetheless, the depth of melt region 76 exceeds the depth of any residual scratches due to mechanical polishing, and thus tends to remove the peaks and valleys formed by such scratches (and other acicular features).

Figure 7:
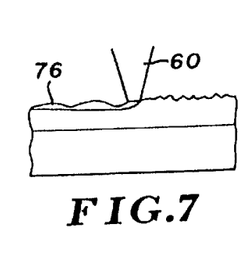
Figure 8:
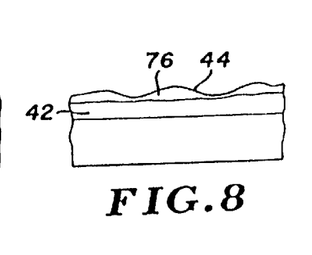

As seen in FIG. 7, translation of beam 60 to the right has removed the acicular features, leaving a lower frequency waviness or undulation in the wake of the moving liquified region. FIG. 8 shows a completely polished surface.

While polishing may be accomplished by continuous operation of diode laser 56, a pulsed laser is preferred. Given the nanosecond pulse duration and a frequency of 50,000 pulses per second, substrate disk 50 is rotated at a substantially reduced speed, so that successive pulses are directed onto overlapping impingement areas. Thus, despite the relatively larger impingement area, laser polishing requires more time than texturing, for example 10–30 seconds.

Figure 9:
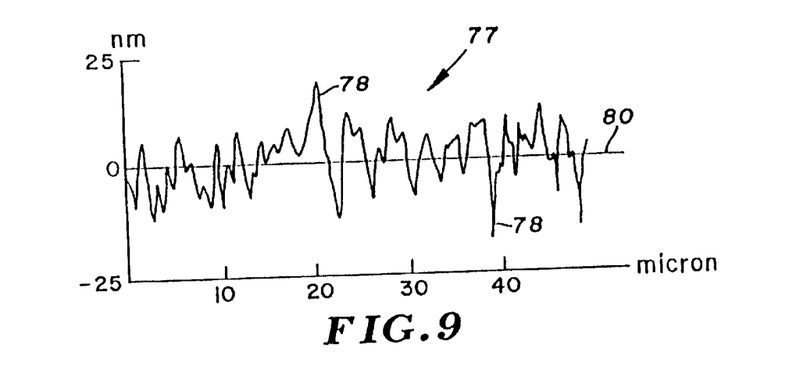
FIG. 9 depicts an atomic force microscopy surface profile of a mechanically textured substrate.
Figure 10:
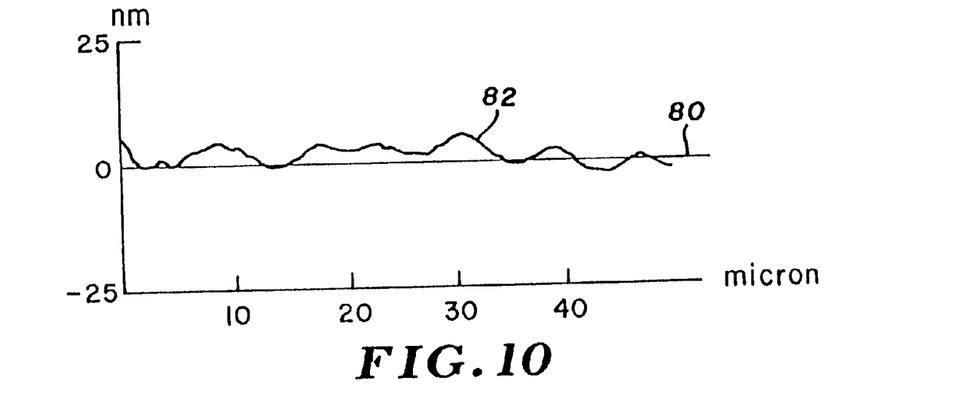
FIG. 10 depicts the surface profile of FIG. 9, following laser polishing of the substrate.

FIGS. 9–12 depict surface roughness traces measured by atomic force microscopy and illustrate two applications of laser polishing. The first, in FIGS. 9 and 10, is the laser treatment of a mechanically textured surface 77, either a dedicated head contact zone or a data zone that does not involve an extremely low transducing head flying height. FIG. 9 illustrates the acicular features 78 present after mechanical texturing. Surface roughness, in terms of maximum peak heights above a nominal surface plane 80, is about 25 nm.

The roughness trace in FIG. 10, after laser polishing, illustrates a substantial reduction in surface roughness, to about 10 nm. Further, substrate material melted by the laser energy has flowed, removing substantially all of the acicular features and leaving smoother, rounded features 82 that provide a lower frequency waviness. The removal of the sharp peaks is particularly advantageous, since the peaks tend to fracture upon head contact. Thus, the surface after laser treatment is better able to withstand intentional or incidental head contact, generating less debris.

Figure 11:
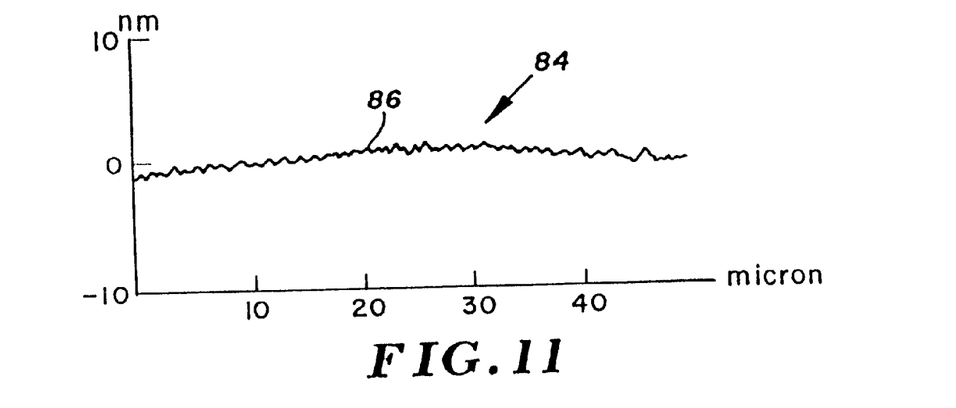
FIG. 11 depicts an atomic force microscopy surface profile of a mechanically polished substrate.

FIG. 11 shows a surface roughness trace 84 of an extremely finely abraded or "superpolished" substrate disk. Surface roughness based on peak heights is less than 2 nm, but residual scratches form acicular features 86.

Figure 12:
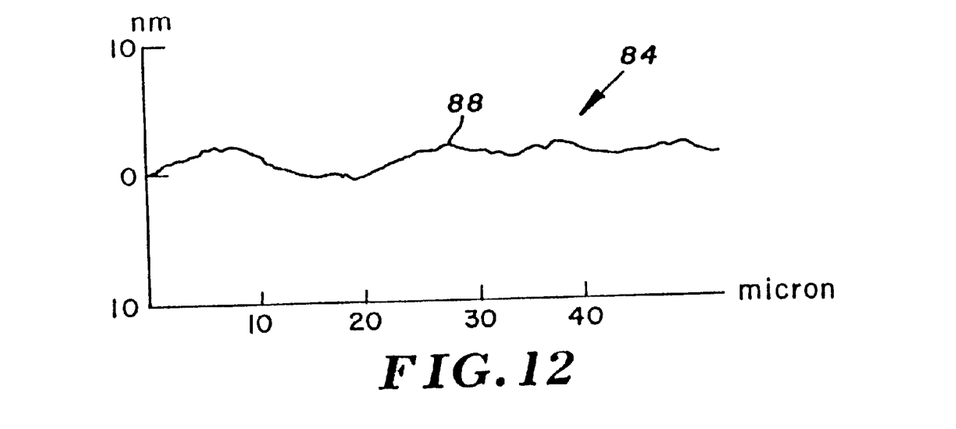
FIG. 12 illustrates the surface profile of FIG. 11, following laser polishing of the substrate.

The same substrate is shown in FIG. 12, following laser polishing. Surface peak roughness actually is increased to about 3 nm. However, the elimination of residual scratches and transformation to the rounded, more gently curvilinear profile, outweigh any disadvantage arising from the slight increase in surface roughness. First, as in the case of laser treating the textured surface, the more rounded features 88 are better suited to withstand incidental contact with the transducing head. Secondly, because the magnetizable film and other subsequently applied layers tend to replicate the substrate surface topography, resistance to corrosion is enhanced because of greater uniformity in the protective carbon layer. Signal quality also is improved, due to the virtual absence of residual scratches and replications of acicular features in subsequently applied layers.

Figure 13:
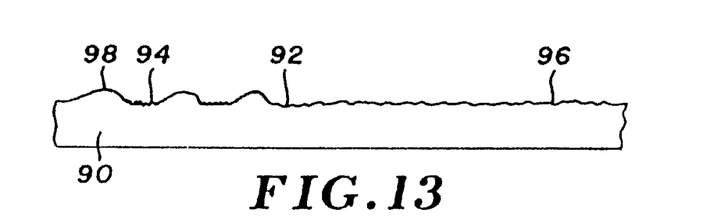
FIG. 13 illustrates the surface profile of a substrate with a laser textured dedicated head contact zone.
Figure 14:
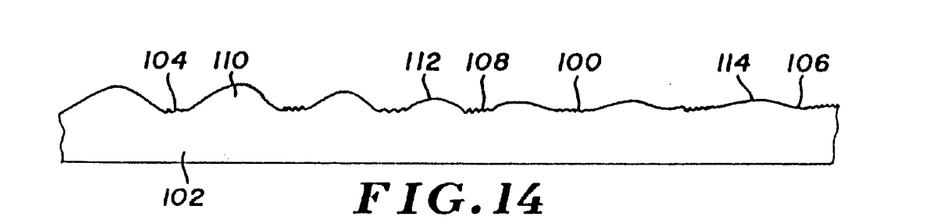
FIG. 14 illustrates the surface profile of a substrate with laser textured contact and transition zones, and a laser polished data zone.
Figure 15:
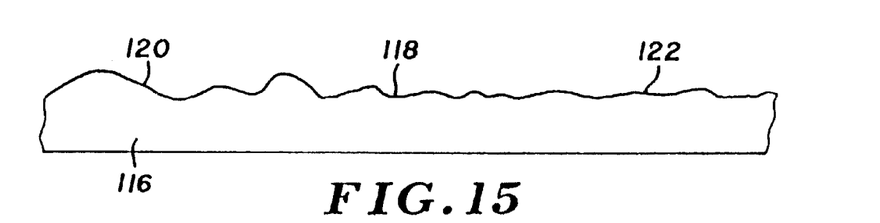
FIG. 15 illustrates the surface profile of a substrate with a mechanically textured contact zone and a mechanically polished data zone, both zones subsequently laser treated.

FIGS. 13–15 illustrate the manner in which apparatus 46 can be used to selectively texture different regions of substrate disks.

FIG. 13 illustrates part of a substrate disk 90 having a substrate surface 92 selectively treated to provide a laser textured contact zone 94 and a mechanically abraded, superpolished data zone 96. Along the data zone, substrate surface 92 is polished to a peak roughness of less than about 3 nm, comparable to the results of mechanical polishing illustrated in FIG. 11. Along contact zone 94, the substrate surface also preferably is polished to this extent. Then, the substrate surface is exposed to beam 60 throughout the contact zone, to form nodules 98 having heights of 0.3–1.0 microinches (7.6–25.4 nm). The primary advantage, along with the surface improvement over the contact zone, is that no step is required between data zone 96 and contact zone 94. Thus, there is no need to choose between a gradual transition and step that takes up space that otherwise could be used for storing data and a narrow, steeper step that increases the risk of transducing head disturbances.

In FIG. 14, a substrate surface 100 of a substrate disk 102 has been treated with apparatus 46 to provide a contact zone 104, a data zone 106 and a transition zone 108 between the contact and data zones. Across contact zone 104, beam 60 is applied to form spaced apart nodules 110 having nodule heights in the range of 0.8–1.0 microinches (20.3–25.4 nm), and more preferably about 0.8 microinches (about 20 nm).

Radially across transition zone 108, the heights of nodules 112 are ramped, i.e. gradually decreased from about 0.8–1.0 microinches (20.3–25.4 nm) to about 0.1–0.3 microinches (2.5–7.6 nm). Nodules 112 are formed in a continuous spiral path by pulsing diode laser 56 as previously explained, but with the additional feature that energy at impingement area 70 is gradually reduced as beam 60 is moved radially outward. This is accomplished by maintaining a constant level of power at which the diode laser is fired, while gradually translating neutral density filter 62 in the transverse direction (arrow, FIG. 3), which gradually attenuates the beam beyond plate 66. The incline of transition zone 108 is a function of its radial width as well as the maximum and minimum nodule heights.

Data zone 106 is treated first by laser polishing after a fine mechanical abrasion, as explained in connection with FIGS. 6–8, to achieve a surface profile similar to that depicted in FIG. 12. Following laser polishing, data zone 106 further is exposed to beam 60 to form nodules 114 having heights in the range of 0.1–0.3 microinches (2.5–7.6 nm), i.e. less than the minimum height of nodules 112. This imparts a controlled surface roughness satisfactory for most transducing head flying heights and provides a controlled texture that better withstands incidental transducing head contact.

FIG. 15 shows a substrate disk 116 having a substrate surface 118 treated to form a contact zone 120 and a data zone 122. Over contact zone 120, the substrate surface is mechanically textured to provide a surface peak roughness on the order of 25 nm. Data zone 122 is subjected to finer mechanical abrasion, yielding a surface peak roughness of at most about 3 nm.

Following mechanical abrasion, the entire substrate surface is laser polished. Throughout contact zone 120, laser polishing reduces surface roughness substantially, to a value on the order of 10 nm. Polishing does not materially alter the 3 nm surface roughness across the data zone. Throughout the contact zone and the data zone, laser polishing causes the substrate material to flow, eliminating residual scratches and replacing acicular features with rounded features. Thus the entire substrate surface exhibits better corrosion resistance.

Figure 16:
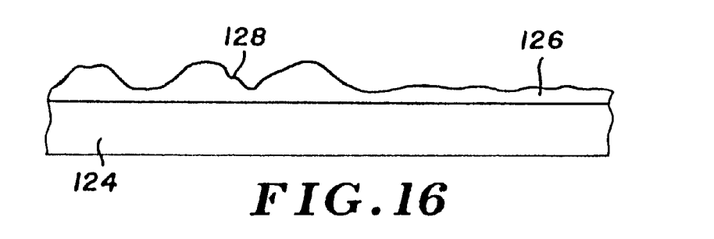
FIG. 16 is a sectional view of a glass substrate treated to enhance energy absorption near its upper surface.

FIG. 16 shows a glass substrate 124, treated to provide an energy-absorbing layer 126. Preferably the energy-absorbing layer is a metallic layer, e.g. chromium sputtered, vapor deposited or plated onto glass substrate 124 to a thickness of at least 5 nm. Other metals can be employed, such as tungsten or titanium.

Metallic layer 126 is exposed to a pulsed laser beam to texture a contact zone 128. This is accomplished in substantially the same manner as the formation of nodules discussed above in connection with FIGS. 4 and 5, with the same operating ranges for laser power (1–50 µJ, more preferably 1–6 µJ), focal area diameter (5–15 microns), and pulse duration (5–200 ns, more preferably 20–40 ns). Surface topographies can be influenced by varying these parameters in the manner discussed above.

Figure 17:
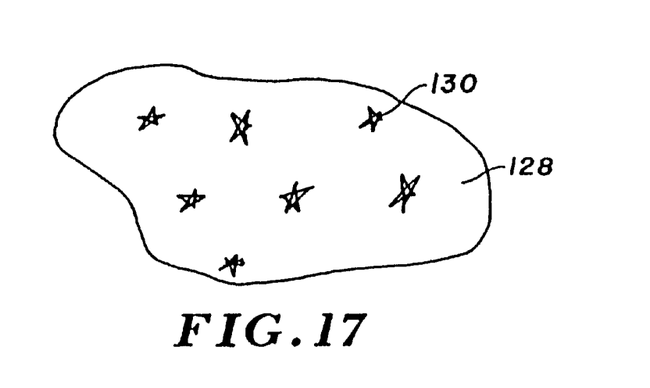
FIG. 17 is a plan view of the substrate upper surface, illustrating surface fracture discontinuities.
Figure 18:
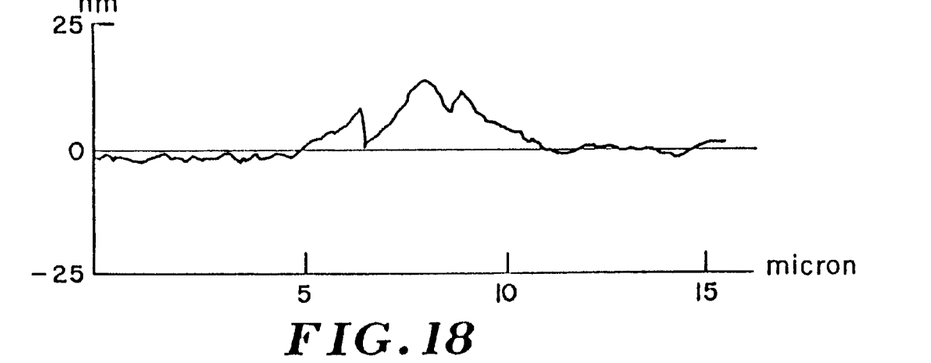
FIG. 18 illustrates the profile of one of the discontinuities in FIG. 17.

Further, surface topographies are influenced by the thickness of the chromium layer. When applied as an extremely thin film, e.g. 5–10 nm, the chromium acts virtually exclusively as an agent for localized energy absorption, thereby causing localized deformations (surface melting and local microfracturing) in the glass. FIG. 17 illustrates the irregular, somewhat star-like profiles of the fractures 130, while FIG. 18 is an atomic force microscopy profile trace showing the more acicular character of these fractures, as compared to the nodules discussed above. The fractures have heights varying over a wide range as compared to nodules, i.e. 0.1–8 microinches (2.54–200 nm).

For increased chromium layer thicknesses, e.g. in the range of 10–100 nm, the resulting topography is a combination of the above-discussed microfractures and rounded nodules formed of chromium in the manner discussed in connection with the aluminum nickel-phosphorous substrate. Finally, for material thicknesses greater than 100 nm, topography is determined virtually exclusively by nodule formation.

Figure 19:
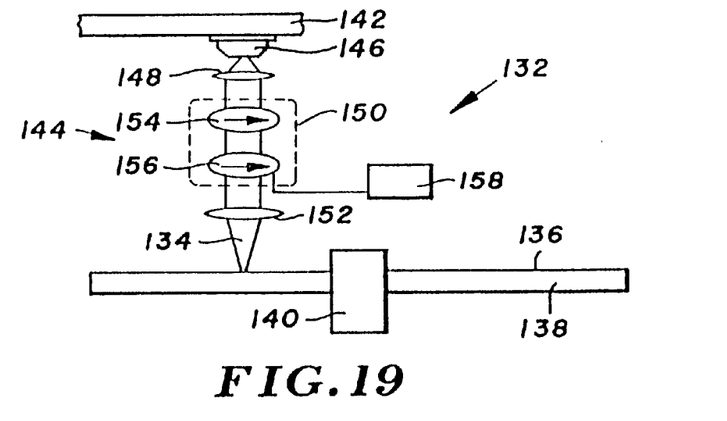
FIG. 19 is an elevational view of an alternative texturing and polishing apparatus.

FIG. 19 illustrates a laser texturizing and polishing apparatus 132 similar to apparatus 46, in that a laser beam 134 is focused onto a substrate surface 136 of a substrate disk 138. The disk is rotated on a spindle 140, while a carriage 142 radially translates a laser module 144. The laser module includes a diode laser 146 providing energy to beam collimating optics 148. The columnar beam is transmitted through an attenuator 150 to focusing optics 152, then to the substrate surface.

The difference lies in the structure of the attenuator. Attenuator 150 is a polarizing device that includes an upstream polarizing disk 154, a downstream polarizing disk 156 aligned with disk 154, and a mechanism 158 for rotating disk 156. By rotation, disk 156 is positionable to align the respective polarization axes of disks 154 and 156 (indicated by the arrows), for maximum transmission of the laser energy. As disk 156 is moved away from alignment, transmissivity of the polarizing device gradually decreases. Thus, rotation of disk 156 achieves the same result as linear translation of neutral density filter 62 in FIG. 3.

With reference to FIG. 2, fabrication of magnetic disk 16 involves application of several layers after the substrate disk has been selectively textured and polished. A layer of chrome is sputter deposited onto substrate surface 44, preferably to a thickness of about 10–100 nm. This provides an underlayer 160 particularly well suited for subsequent deposition of a magnetic thin film, in that the crystalline structure of underlayer 160 can advantageously control the epitaxy and crystalline structure of the magnetic film. A recording layer 162 of a magnetizable material, e.g. a cobalt/tantalum/chromium or a cobalt/platinum/chromium alloy, is sputter deposited to a thickness of about 10–50 nm. Finally, a protective layer 164, e.g. carbon, is sputter deposited onto the recording layer to a thickness of about 5–30 nm. As noted above, the removal of acicular features through laser polishing of the substrate surface enables depositing of carbon layer 164 at a more uniform thickness, increasing resistance to corrosion.

Figure 20:
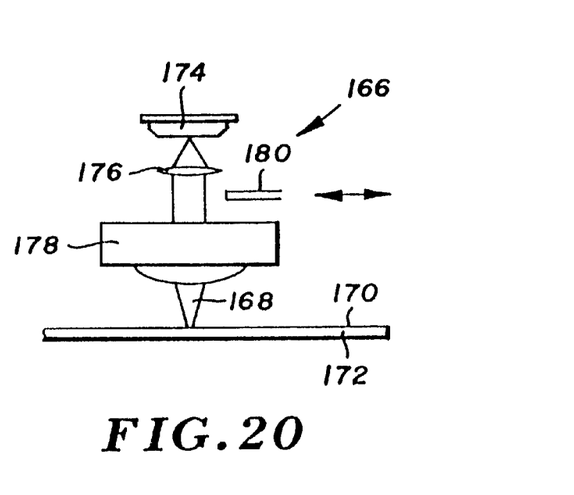
FIG. 20 is an elevational view of a further alternative texturing and polishing apparatus.

FIG. 20 illustrates another alternative laser texturing and polishing apparatus 166 for focusing a laser beam 168 onto a substrate surface 170 of a substrate disk 172. A diode laser 174 generates the laser beam, which is collimated at collimating optics 176, and then provided to a scanning assembly 178. An attenuator 180, e.g. a neutral density filter, is movable horizontally as indicated by the arrows, to selectively attenuate the beam.

In the manner known to those skilled in the art, optics (including lenses and mirrors) within scanning assembly 178 are manipulated to translate the beam relative to substrate disk 172, over a spiral path that replicates the path achieved by radial movement of the laser diode in concert with disk rotation as in apparatus 46 and apparatus 132. Accordingly, while the optics are more complex in apparatus 166, the substrate disks undergoing treatment can remain stationary.

Thus in accordance with the present invention, magnetic recording media can be selectively textured to provide transducing head contact zones, data zones and intermediate transition zones that are tightly controlled as to surface roughness, either for enhanced uniformity in a contact zone or landing zone, or for a controlled ramping or roughness gradient radially across a transition zone. Controlled roughness is achieved by forming rounded nodules, and it is through control of the individual nodule heights that the desired surface roughness is achieved. As compared to previously known laser discontinuities, in particular depressions surrounded by raised rims, the nodules exhibit better uniformity, improved resistance to head contact at lower surface roughnesses, better lubricant replenishment and reduced debris entrapment. Laser polishing enhances performance, even as compared to extremely smooth mechanically polished surfaces, in eliminating residual scratches for improved corrosion resistance and signal integrity.

What is claimed is:

1. In the fabrication of a magnetic data reading and recording medium in which a magnetizable recording layer is applied over a non-magnetizable substrate, a process for surface treating the non-magnetizable substrate, including:
   mechanically abrading a non-magnetizable substrate to form on the substrate a substantially planar substrate surface having a nominal roughness, due to residual scratches formed by the mechanical abrasion and having residual scratch depths; and
   following said mechanical abrasion, applying coherent radiant energy to the substrate surface over a selected surface portion thereof, to melt the substrate within a melt region that includes said selected surface portion and has a melt region depth, in a substrate thickness direction inwardly of the substrate surface, that exceeds said residual scratch depths and is less than a thickness of said substrate, whereby substrate material in the melt region flows, to substantially eliminate the residual scratches; and
   allowing the substrate material to solidify, thus to form said selected surface portion as specular and substantially free of residual scratches.

2. The process of claim 1 wherein:
   said application of radiant energy includes directing a beam of the coherent radiant energy onto the substrate surface to define an irradiation area of beam impingement onto the substrate surface, and translating the non-magnetizable substrate and the beam relative to one another to move the irradiation area along a path substantially covering said selected surface portion.

3. The process of claim 2 wherein:
   the non-magnetizable substrate is disk shaped, and the irradiation area is moved in a curvilinear path to define the selected surface portion as annular.

4. The process of claim 3 wherein:
   said irradiation area is moved in a spiral path.

5. The process of claim 2 wherein:
   said coherent energy is laser energy, and the step of directing the beam of the coherent radiant energy includes focusing the beam at the substrate surface.

6. The process of claim 5, wherein:
   said directing a beam of the coherent radiant energy comprises orienting the beam substantially perpendicular to the substrate surface.

7. The process of claim 5 wherein:
   the step of directing the beam further includes pulsing the laser energy at a selected pulse duration, and selecting a pulse frequency and speed of irradiation area translation along said path, such that successive positions of said irradiation area corresponding to successive pulses overlap one another.

8. The process of claim 7 wherein:
   the selected duration of each pulse is about ten ns.

9. The process of claim 5 wherein:
   the beam of laser energy is continuous.

10. The process of claim 1 wherein:
    the depth of said melt region is in the range of 38–250 nm.

11. The process of claim 10 wherein:
    said depth is about 38 nm.

12. The process of claim 1 wherein:
    said mechanical abrasion comprises mechanically polishing said substrate surface whereby said nominal roughness is at most about 3 nm.

13. The process of claim 1 wherein:
    said mechanical abrasion comprises mechanically texturing said substrate surface whereby said nominal roughness is within the range of about 7.6–25 nm, and then mechanically polishing said selected surface portion to a roughness of at most about 3 nm, to provide (i) a data zone comprising the selected surface portion and (ii) a contact zone having said nominal roughness; and
    said applying coherent radiant energy includes applying the radiant energy to the contact zone and to the data zone.

14. The process of claim 1 wherein:
    the substrate is formed of aluminum and further includes a nickel-phosphorous alloy plated onto the aluminum in an alloy layer of substantially uniform thickness, said substrate surface being an exposed surface of said alloy layer; and
    wherein said depth is at most about one-tenth of the thickness of said alloy layer.

15. A non-magnetizable substrate for supporting a layer of magnetizable material capable of storing magnetically readable data, including:
    a disk-shaped substrate body formed of non-magnetizable material and having a substrate surface, said substrate surface being substantially planar, having a nominal surface roughness less than about 10 nm, and being substantially free of residual scratches and other acicular features.

16. The substrate of claim 15 wherein:
    said non-magnetizable material includes aluminum comprising the majority of said disk-shaped substrate body, and further comprises a nickel-phosphorous alloy forming a layer on the aluminum and having a uniform thickness in the range of about 2–10 microns; and wherein the substrate surface is an exposed surface of said nickel-phosphorous layer.

17. The substrate of claim 16 further including:

a magnetizable film formed over said nickel-phosphorous layer and having a substantially uniform thickness whereby the magnetizable film layer tends to replicate the topography of the substrate surface.

18. The substrate of claim 17 further including:

a protective cover layer deposited on said magnetizable film and being substantially uniform in thickness whereby it replicates the topography of the magnetizable film.

19. The substrate of claim 18 wherein:

said nickel-phosphorous layer further includes a contact zone surface adjacent the substrate surface and having a surface roughness greater than said nominal surface roughness, and wherein said magnetizable film and protective cover layer further overlie and tend to replicate the topography of the contact zone surface.

20. The substrate of claim 19 wherein:

said contact zone surface is comprised of a plurality of first rounded nodules, each nodule extended outwardly of a nominal surface plane of the contact zone surface by a height in the range of 3–25 nm.

21. The substrate of claim 20 wherein:

said first rounded nodules are substantially uniform in height.

22. The substrate of claim 20 wherein:

said nickel-phosphorous layer further includes a transition zone surface between the contact zone surface and the substrate surface, said transition zone surface having a roughness gradient.

23. The substrate of claim 22 wherein:

said transition zone includes multiple second rounded nodules, and the height of the second rounded nodules, measured from a nominal surface plane of the transition zone surface, increases gradually in the direction away from the substrate surface and toward the contact zone surface.

24. A process for selectively texturing magnetic recording media, including:

forming a specular substrate surface on a non-magnetizable substrate body, said substrate surface being substantially planar and having a nominal roughness of no more than about 7.6 nm;

depositing a magnetizable film over said substrate surface as a layer substantially uniform in thickness to provide a recording surface; and concentrating radiant energy selectively upon a plurality of locations on a selected zone either of the substrate surface or the recording surface, to controllably alter the topography of the selected zone at each of the locations to form a rounded nodule having a height, above a nominal surface plane of the selected zone, in the range of 2.5–25 nm.

25. The process of claim 24 wherein:

said concentration of radiant energy comprises focusing pulsed laser energy onto said selected zone.

26. The process of claim 25 wherein:

the concentration of the radiant energy further includes orienting the laser energy beam substantially perpendicular to the substrate surface, to form a substantially circular irradiation area.

27. The process of claim 25 wherein:

said concentrating of the radiant energy is performed on the substrate, and the substrate is formed of an aluminum substrate body plated with a nickel-phosphorous alloy to provide an alloy layer, and wherein said nodules are formed on the alloy layer.

28. The process of claim 25 wherein:

said substrate body is formed of a glass material and an energy absorbent opaque layer adjacent the glass material and defining the substrate surface, and said concentration of the radiant energy is performed on the opaque layer.

29. A process for treating a non-magnetizable substrate, preceding the application of a magnetic recording film to the non-magnetizable substrate, including:

mechanically abrading a non-magnetizable substrate to form on the substrate a substantially planar substrate surface having a nominal roughness; and concentrating radiant energy upon a plurality of locations over a treatment area on the substrate surface, to form at each of said locations a rounded nodule having a height, above a nominal surface plane of the substrate surface, in the range of 2.5–25 nm.

30. The process of claim 29 wherein:

said treatment area comprises a contact zone surface, and wherein all of said nodules have heights in the range of about 20–25 nm.

31. The process of claim 30 wherein:

said concentration of radiant energy includes translating the non-magnetizable substrate and a pulsed coherent energy beam with respect to one another, and with respect to a pulse duration and pulse frequency of the coherent energy, to form said nodules in a continuous curvilinear path over said treatment area.

32. A process for texturing a substrate surface of a glass substrate, in preparation for subsequent application of a magnetizable thin film, including:

depositing a metal onto the glass substrate as a metallic layer of uniform thickness of at least 5 nm;

concentrating coherent radiant energy selectively upon a plurality of locations over a treatment area of the metallic layer, to controllably alter the substrate topography at each of the locations to form at each location a surface irregularity, said surface irregularities having heights, above a nominal surface plane of the substrate surface, in the range of 3–200 nm.

33. The process of claim 32 wherein:

said metallic layer has a thickness in the range of about 5–10 nm, and said irregularities consist substantially of microfractures of the glass adjacent the metallic layer.

34. The process of claim 32 wherein:

said metallic layer has a thickness in the range of about 10–100 nm, and said irregularities comprise microfractures of the glass material and rounded nodules formed of the metallic material.

35. The process of claim 32 wherein:

said metallic layer has a thickness greater than 100 nm, and said irregularities consist substantially of rounded, outwardly extended nodules formed of the metallic material.

36. A magnetic recording medium, including:

a disk-shaped substrate body formed of a non-magnetizable material and having a substantially planar substrate surface including a data zone having a nominal roughness, and a contact zone having a contact zone roughness determined by multiple rounded nodules formed throughout the contact zone and having nodule heights, above a nominal surface plane of the contact zones, in the range of 2.5–25 nm to define a contact zone roughness greater than said nominal roughness.

37. The medium of claim 36 wherein:

said substrate includes an aluminum substrate body and a layer of a nickel phosphorous alloy applied to the substrate body in a uniformly thick layer, and wherein said nodules are formed of the nickel-phosphorous alloy.

38. The medium of claim 36 wherein:

said substrate includes a glass substrate body and an energy-absorptive metal applied to the substrate body in a layer of substantially uniform thickness, and wherein the nodules are formed of said metal.

39. The medium of claim 36 wherein:

said substrate surface further includes a transition zone between the contact zone and the data zone; and wherein the transition zone has a roughness that increases gradually from the nominal roughness to the contact zone roughness, in the direction from the data zone toward the contact zone.

40. The medium of claim 39 wherein:

the graduated roughness of the transition zone is defined by multiple nodules formed throughout the transition zone and having nodule heights that increase gradually, in said direction, from about 2.5 nm to about 15 nm.

41. The medium of claim 36 further including:

a magnetizable film formed over said substrate surface and having a substantially uniform thickness whereby the magnetizable film tends to replicate the topography of the substrate surface.

42. The medium of claim 41 further including:

a protective cover layer deposited on said magnetizable film and having a substantially uniform thickness whereby it tends to replicate the topography of the magnetizable film.

43. The medium of claim 41 further including:

a metallic, non-magnetizable underlayer between the substrate surface and the magnetizable film, and having a substantially uniform thickness.

* * * * *